(12) United States Patent
Matsumoto

(10) Patent No.: US 11,956,344 B2
(45) Date of Patent: Apr. 9, 2024

(54) COMMUNICATION APPARATUS, METHOD FOR CONTROLLING COMMUNICATION APPARATUS, AND STORAGE MEDIUM

(71) Applicant: CANON KABUSHIKI KAISHA, Tokyo (JP)

(72) Inventor: Hitoshi Matsumoto, Tokyo (JP)

(73) Assignee: Canon Kabushiki Kaisha, Tokyo (JP)

(\*) Notice: Subject to any disclaimer, the term of this patent is extended or adjusted under 35 U.S.C. 154(b) by 56 days.

(21) Appl. No.: 17/721,009

(22) Filed: Apr. 14, 2022

(65) Prior Publication Data
US 2022/0345290 A1  Oct. 27, 2022

(30) Foreign Application Priority Data
Apr. 26, 2021  (JP) ................. 2021-073830

(51) Int. Cl.
*H04L 7/04* (2006.01)
*H04L 43/106* (2022.01)

(52) U.S. Cl.
CPC ............ *H04L 7/041* (2013.01); *H04L 43/106* (2013.01)

(58) Field of Classification Search
CPC ....... H04L 7/04; H04L 7/0041; H04L 43/106; H04L 47/36; H04L 47/43; H04L 29/08; H04L 67/125; H04L 29/06; H04L 12/54; H04L 12/56; H04L 69/22; H04L 69/28; H04L 47/28; H04L 69/323; H04L 12/26; H04J 3/06; H04J 3/16; H04J 3/0661; H04J 3/0632; H04J 3/0667; H04J 3/0673; H04J 3/0688; H04J 3/1658

USPC .......................................................... 370/354
See application file for complete search history.

(56) References Cited

U.S. PATENT DOCUMENTS

| | | | |
|---|---|---|---|
| 8,166,216 B1* | 4/2012 | Kondapalli | G06F 13/385 713/400 |
| 9,391,768 B2* | 7/2016 | Roberts | H04Q 11/0001 |
| 9,628,383 B2* | 4/2017 | Magee | H04L 12/413 |
| 9,641,269 B2* | 5/2017 | Yamamoto | H04J 3/0697 |
| 9,667,370 B2* | 5/2017 | Tzeng | H04L 12/56 |
| 9,819,541 B2* | 11/2017 | Garg | H04L 45/20 |
| 10,762,013 B2* | 9/2020 | Mallela | G06F 13/32 |
| 11,239,933 B2* | 2/2022 | Mok | H04J 3/0658 |
| 11,316,912 B2* | 4/2022 | Lapointe | H04N 21/64322 |
| 11,356,188 B2* | 6/2022 | He | H04L 69/323 |
| 11,528,202 B2* | 12/2022 | Koyama | H04L 43/062 |
| 11,711,158 B2* | 7/2023 | Levi | H04L 49/3063 370/509 |
| 2014/0226683 A1* | 8/2014 | Castiel | H04L 12/64 370/474 |
| 2021/0294378 A1* | 9/2021 | Rabinovich | G06F 1/12 |

(Continued)

FOREIGN PATENT DOCUMENTS

JP    2018113623 A    7/2018

*Primary Examiner* — Man U Phan
(74) *Attorney, Agent, or Firm* — Canon U.S.A., Inc., IP Division

(57) ABSTRACT

A communication apparatus is provided and receives a communication packet, acquires a timestamp of a reception of the communication packet, analyzes a type of the received communication packet, transfers the received communication packet to a predetermined memory based on information indicating an analyzed type of the communication packet, and associates the analyzed type of the communication packet with the acquired timestamp.

11 Claims, 8 Drawing Sheets

(56) References Cited

U.S. PATENT DOCUMENTS

| | | | |
|---|---|---|---|
| 2022/0006607 A1* | 1/2022 | Bordogna | H04L 7/0091 |
| 2022/0329337 A1* | 10/2022 | Anand | H04Q 11/0067 |

* cited by examiner

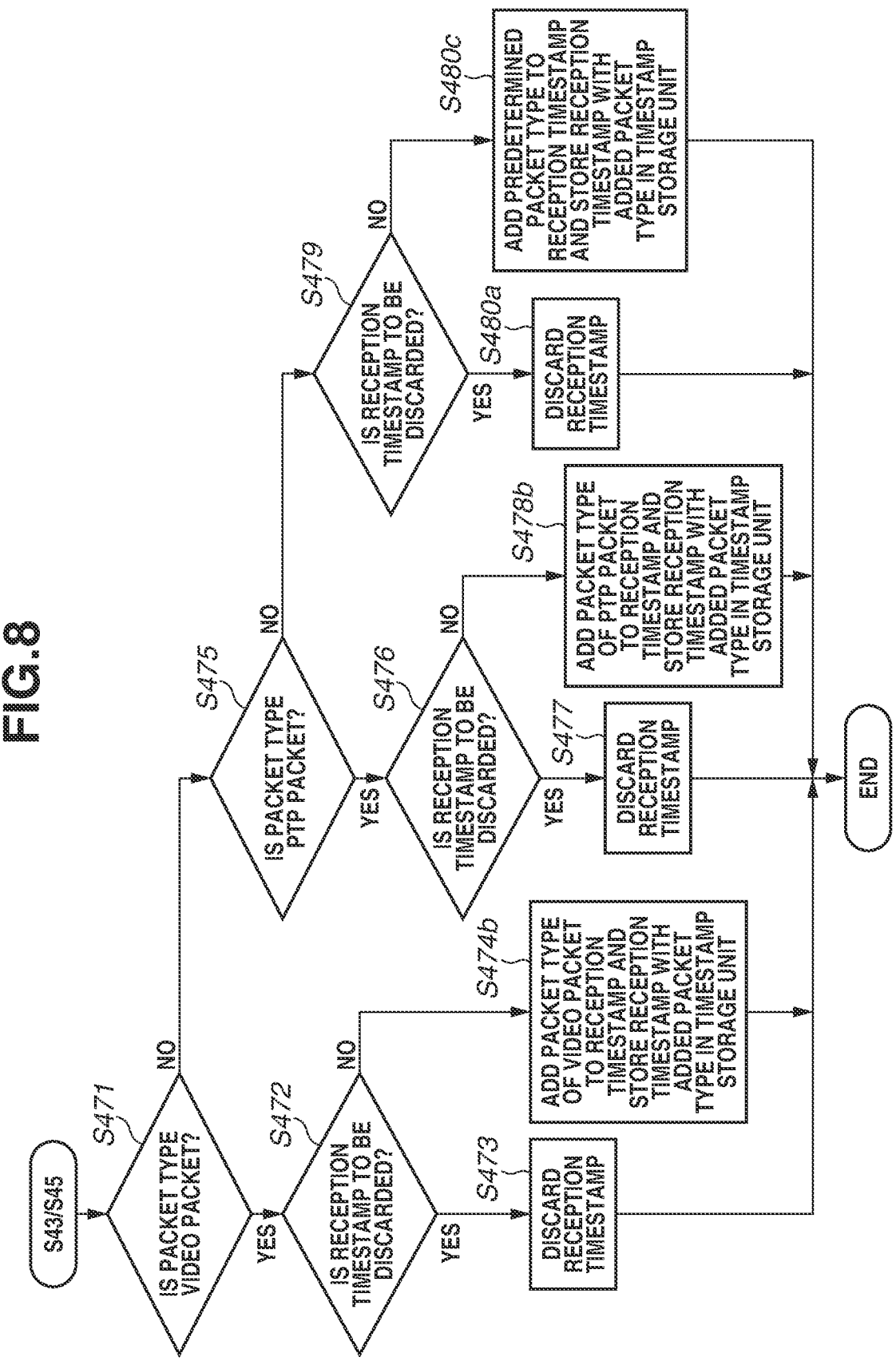

COMMUNICATION APPARATUS, METHOD FOR CONTROLLING COMMUNICATION APPARATUS, AND STORAGE MEDIUM

This application claims the benefit of Japanese Patent Application No. 2021-073830, filed Apr. 26, 2021, which is hereby incorporated by reference herein in its entirety.

BACKGROUND

Field

The present disclosure relates to a communication apparatus capable of performing time synchronization with another communication apparatus.

Description of the Related Art

Techniques for synchronously capturing images from a plurality of viewpoints using a plurality of cameras situated at different positions and generating virtual viewpoint content using the plurality of synchronously-captured viewpoint images have been available. Use of the virtual viewpoint content enables a user to view, for example, highlight scenes of soccer or basketball games from various angles. This provides a more realistic feeling to the user compared to normal images.

One of the time synchronization techniques using a network that realizes synchronization imaging as described above is the Precision Time Protocol (PTP) defined in the Institute of Electrical and Electronics Engineers (IEEE) standards 1588-2008. According to PTP, a leader device having an accurate time transmits a PTP packet carrying information of the time. A follower device performs time synchronization by receiving the PTP packet.

Various communication packets are transmitted on a communication network on which time synchronization is performed using PTP. Types of communication packets to be transferred include PTP packets for performing time synchronization between communication apparatuses and between a communication apparatus and a leader device, Transmission Control Protocol over Internet Protocol (TCP/IP) packets for controlling communication apparatuses, and packets of images and video images captured by cameras.

Japanese Patent Application Laid-Open No. 2018-113623 discusses a communication apparatus that sorts a communication packet transferred on a communication network based on the type of the communication packet.

Specifically, Japanese Patent Application Laid-Open No. 2018-113623 discusses a communication apparatus that analyzes a Type of Service (TOS) field of an IP header of a received communication packet and sorts the communication packet based on an IP Precedence value.

There have been cases where a communication apparatus configured to sort a plurality of types of communication packets is unable to perform PTP time synchronization processing.

Specifically, in a case where a PTP follower device outputs a reception packet and a reception timestamp separately and a module to perform reception processing is changed based on the type of the reception packet, the correspondence between the reception packet and the reception timestamp is lost. Thus, the PTP time synchronization processing may be performed using an inappropriate reception timestamp, and the time synchronization with a leader device may be lost.

SUMMARY OF THE INVENTION

The present disclosure is based on the above-described issue and is directed to enabling a communication apparatus capable of processing a plurality of types of communication packets to perform time synchronization as appropriate with another communication apparatus.

According to an aspect of the present disclosure, a communication apparatus includes a reception unit configured to receive a communication packet, a transfer unit configured to transfer the communication packet received by the reception unit to a predetermined memory, an acquisition unit configured to acquire a timestamp of the reception of the communication packet by the reception unit, an analysis unit configured to analyze a type of the communication packet received by the reception unit, and a control unit configured to perform control to notify the transfer unit of information indicating the type of the communication packet analyzed by the analysis unit and to associate the information with the timestamp acquired by the acquisition unit.

Further features of the present disclosure will become apparent from the following description of exemplary embodiments with reference to the attached drawings.

BRIEF DESCRIPTION OF THE DRAWINGS

FIG. 8 is a flowchart illustrating an example of a detailed process of the reception timestamp sorting processing illustrated in FIG. 4 according to a second exemplary embodiment.

DESCRIPTION OF THE EMBODIMENTS

Figure 1:
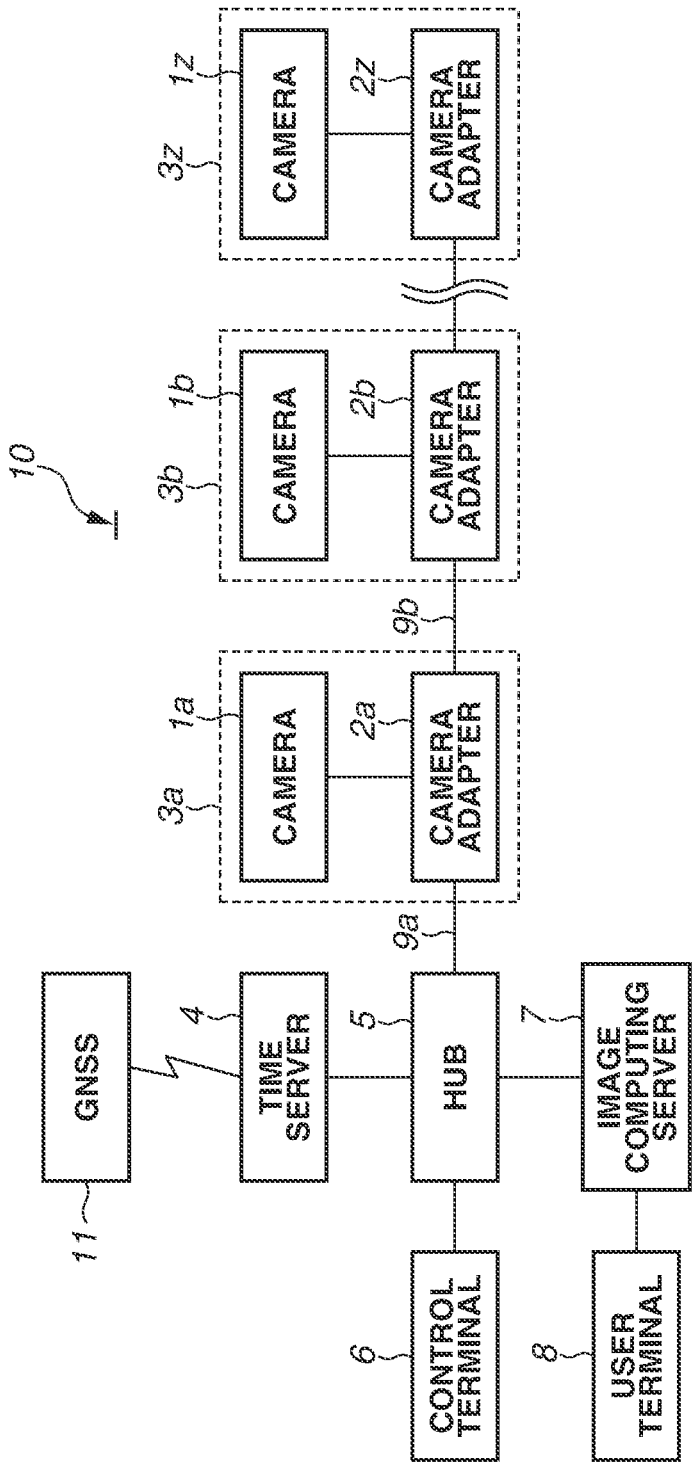
FIG. 1 is a block diagram illustrating an example of a network configuration of a synchronization imaging system according to an exemplary embodiment.

Various exemplary embodiments of the present disclosure will be described in detail below with reference to the attached drawings. The exemplary embodiments described below are mere examples of implementations of the present disclosure and should be modified or changed as needed for a configuration of a device or various conditions to which the present disclosure is applied, and the present disclosure is not limited to the exemplary embodiments described below. Further, not all combinations of features described in the exemplary embodiments are always essential to the technical solution of the present disclosure. Similar components are described being given the same reference numerals.

According to a first exemplary embodiment, a communication apparatus performs time synchronization by sorting a reception timestamp based on a type of a received communication packet and associating the received communication packet with the reception timestamp.

While an example where the communication apparatus performs time synchronization using the Precision Time Protocol (PTP) defined in the Institute of Electrical and Electronics Engineers (IEEE) 1588 standard is described below, a time synchronization protocol according to the present exemplary embodiment is not limited to PTP.

Network Configuration According to Present Exemplary Embodiment

FIG. 1 illustrates an example of a network configuration of a synchronization imaging system configured to generate virtual viewpoint images in a stadium or a concert hall as an example of a system to which the time synchronization technique according to the present exemplary embodiment is applicable.

As illustrated in FIG. 1, a synchronization imaging system 10 includes sensor systems 3a, 3b, . . . , and 3z, a time server 4, a hub 5, a control terminal 6, an image computing server 7, and a user terminal 8. The hub 5 and the sensor systems 3a, 3b, and 3z are connected together via daisy chains 9a, 9b, . . . . The daisy chaining connects the hub 5 and the sensor systems 3a, 3b, . . . , and 3z in series. The sensor systems 3a, 3b, and 3z each include a plurality of connectors and are connected to other devices via the connectors to establish the daisy-chain connection.

Hereinafter, unless otherwise specified, the 26 sets of sensor systems 3a to 3z according to the present exemplary embodiment will not be discriminated from one another and will be collectively referred to as "sensor systems 3". Similarly, unless otherwise specified, cameras 1a to 1z and camera adapters 2a to 2z in the sensor system 3 will not be discriminated from one another and will be collectively referred to as "cameras 1" and "camera adapters 2", respectively.

While 26 sets of sensor systems 3 are illustrated as an example in FIG. 1, the number of sensor systems 3 is not limited to 26. Further, the plurality of sensor systems 3 does not have to have the same configuration and may include, for example, different types of devices from one another.

According to the present exemplary embodiment, unless otherwise specified, the scope of the term "image" includes concepts of a moving image and a still image. In other words, the synchronization imaging system 10 according to the present exemplary embodiment is capable of processing both still images and moving images.

The time server 4 has a function of distributing time information and distributes time information synchronized with a global navigation satellite system (GNSS) 11 to the sensor system 3. Alternatively, the time server 4 can distribute a local time of the time server 4 as a leader time to the sensor system 3.

The hub 5 sorts a PTP packet carrying the time information distributed from the time server 4 into a destination of the PTP packet. The hub 5 also sorts a packet of image data transmitted from the sensor system 3 to the image computing server 7 into a destination of the packet of the image data.

The control terminal 6 manages an operational state of each component of the synchronization imaging system 10 and controls parameter settings for the components via a network. The network can be a network using Gigabit or 10 Gigabit Ethernet® defined by the IEEE standard and can be configured in combination with an interconnect Infiniband or an industrial Ethernet. Further, the network is not limited to those described above and can be a network of another type.

In FIG. 1, each sensor system 3 includes the camera 1 and the camera adapter 2. However, the configuration of the sensor system 3 is not limited to that described above. The sensor system 3 can further include, for example, an audio device such as a microphone, a storage device such as a hard disk drive (HDD) or a solid state drive (SSD), and a camera platform for controlling a camera orientation.

Further, the sensor system 3 can include one camera adapter 2 and a plurality of cameras 1 or can include one camera 1 and a plurality of camera adapters 2. The plurality of sensor systems 3a, 3b, . . . , and 3z is connected together via the daisy chain 9b. The daisy-chain connection reduces the number of connected cables and wiring work for transferring image data that increases in amount as a resolution of a captured image is increased to 4K or 8K and as a framerate is increased.

The connection form is not limited to the daisy chaining. A star connection form can also be used in which each sensor system 3 is connected to the hub 5 and the plurality of sensor systems 3 transmits and receives data to one another via the hub 5.

Further, while all of the plurality of sensor systems 3 are daisy-chained in FIG. 1, the configuration is not limited to that illustrated in FIG. 1. For example, the plurality of sensor systems 3a, 3b, . . . , and 3z can be divided into several groups, and the divided groups of the sensor systems 3 can also be daisy-chained. This configuration is effective to be used in a stadium. For example, there may be a case where a stadium has several floors and the sensor system 3 is installed in each floor. In such a case, data can be input to the image computing server 7 at each floor or at each semi-perimeter of a stadium. The configuration facilitates installation and increases system flexibility even in a place where it is difficult to connect all the sensor systems 3 via a single daisy chain.

The cameras 1a, 1b, . . . , and 1z capture subject images from a plurality of directions. While the plurality of cameras 1 according to the present exemplary embodiment is described as the same cameras, the cameras 1 can differ in performance and type from one another.

Each of the camera adapters 2a, 2b, . . . , and 2z is connected to the corresponding camera 1 to control the camera 1, acquire captured images, provide synchronization signals, and configure time settings.

The camera adapter 2 performs image processing on image data captured by the camera 1. Specifically, the camera adapter 2 outputs foreground images and background images from the image data. The plurality of camera adapters 2 generates virtual viewpoint images based on the foreground images and the background images captured from a plurality of viewpoints. One or some of the camera adapters 2 can output no background images while outputting foreground images separated from captured images. The camera adapter 2 transmits the processed image data to the image computing server 7 via the daisy-chained hub 5.

The camera adapter 2 herein operates as a PTP follower device and performs time synchronization with the time server 4 serving as a grand master clock (GMC) device. The camera adapter 2 also operates as a PTP leader device serving as a boundary clock (BC) device performing time synchronization with another sensor system 3.

Alternatively, the camera adapter 2 can operate as a transparent clock (TC) device to perform time correction on PTP packets from the GMC device and transfer the resulting PTP packets to another sensor system 3. The camera adapter 2 can also operate as an ordinary clock (OC) device to perform only time synchronization using a PTP packet from the GMC device and a PTP packet transferred from another sensor system 3.

Alternatively, the camera adapter 2 can operate as a TC device and an OC device. In such a case, the camera adapter 2 performs time synchronization using a PTP packet from the GMC device and a PTP packet transferred from another sensor system 3, performs time correction on the PTP packet, and transfers the resulting PTP packet having undergone the time correction to another sensor system 3.

The camera adapter 2 further supplies a control clock defining an imaging timing to the camera 1 using the synchronized time and a reference signal. Details of how a communication packet is processed in the camera adapter 2 will be described below with reference to FIG. 2.

The image computing server 7 processes data acquired from the plurality of sensor systems 3.

Specifically, the image computing server 7 first converts a data format of image data acquired from the sensor system 3 by reconfiguring the image data and then stores the converted image data in a storage device based on an identifier of the camera 1, data type, and/or frame number. The image computing server 7 further receives a designation of a viewpoint from the control terminal 6, reads corresponding image data from the stored information based on the received viewpoint, and performs rendering on the read image data, thereby generating a virtual viewpoint image. In other words, the image computing server 7 generates virtual viewpoint content based on images (multi-viewpoint images) captured by the plurality of sensor systems 3 and viewpoint information.

At least part of the functions of the image computing server 7 can be included in the control terminal 6, the sensor system 3, and/or the user terminal 8.

The user terminal 8 receives the rendered image from the image computing server 7. A user operating the user terminal 8 can thereby view an image from the selected viewpoint. While the virtual viewpoint content is generated by the image computing server 7 in the above-described example, this is not intended as a limitation. In other words, virtual viewpoint content can be generated by the control terminal 6 or the user terminal 8.

<Hardware Configuration and Functional Configuration of Camera Adapter>

Figure 2:
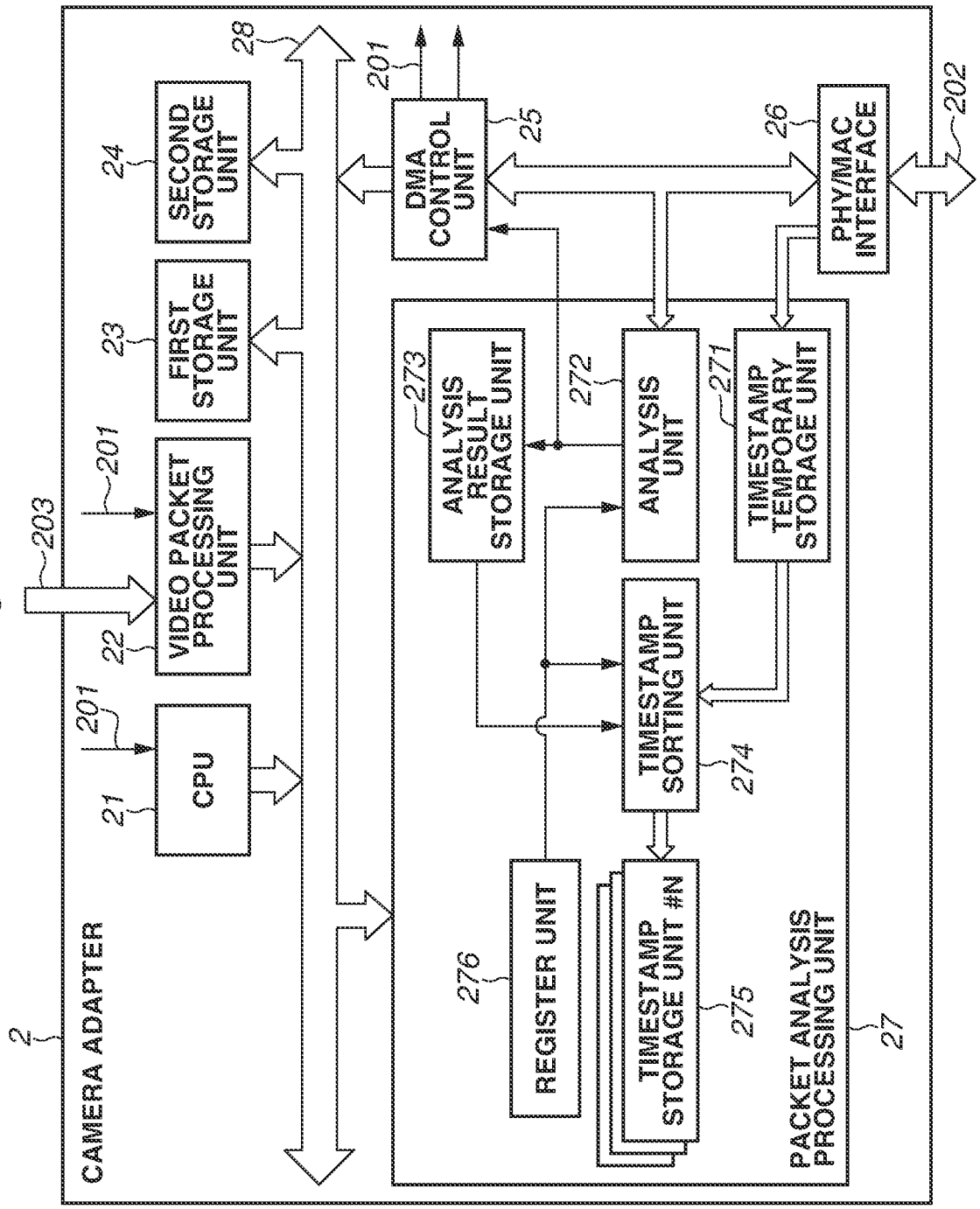
FIG. 2 is a block diagram illustrating an example of a hardware configuration and a functional configuration of a camera adapter (communication apparatus) according to an exemplary embodiment.

FIG. 2 is an example of a block diagram illustrating a hardware configuration and a functional configuration of the camera adapter 2 according to an exemplary embodiment. FIG. 2 illustrates mainly a network control portion of the camera adapter 2 that produces all or part of the functions of the communication apparatus according to the present exemplary embodiment.

Among functional modules of the camera adapter 2 illustrated in FIG. 2, a function to be realized by software is realized by reading a program for realizing the function of the function module from a memory, such as a read-only memory (ROM), to a random access memory (RAM) and executing the read program with a central processing unit (CPU). A function to be realized by hardware is realized by, for example, automatically generating a dedicated circuit on a field programmable gate array (FPGA) using a predetermined compiler based on a program for realizing the function of the function module. Further, a function can be realized by forming a gate array circuit similarly to the FPGA. Alternatively, a function can also be realized by an application-specific integrated circuit (ASIC). The configuration of the functional blocks illustrated in FIG. 2 is a mere example, and a plurality of functional blocks can constitute a single functional block, or one of the functional blocks can be divided into blocks for performing a plurality of functions.

As illustrated in FIG. 2, the camera adapter 2 includes a CPU 21, a video packet processing unit 22, a first storage unit 23, a second storage unit 24, a direct memory access (DMA) control unit 25, a physical layer/media access control layer (PHY/MAC) interface 26, and a packet analysis processing unit 27. The functional blocks (21 to 24, and 27) in the camera adapter 2 are connected together via a system bus 28. The camera adapter 2 is also connected to the camera 1 via a cable 203 for image transmission.

The CPU 21 executes application software on an application layer defined by the Open Systems Interconnection (OSI) model and controls the entire camera adapter 2. The CPU 21 further stores data and programs for use in executing the application software in the first storage unit 23, and reads or writes the stored data as needed via the system bus 28.

Specifically, according to the present exemplary embodiment, the CPU 21 generates a descriptor for PTP stack processing and for DMA transfer control using the DMA control unit 25.

The video packet processing unit 22 receives image data captured by the camera 1 via the cable 203 for image transmission and packetizes the received image data. Hereinafter, packetized image data will be referred to as "video packet". The video packet processing unit 22 generates a descriptor for DMA transfer control using the DMA control unit 25.

While the video packet processing unit 22 is illustrated as dedicated hardware in FIG. 2, this is not intended as a limitation. The video packet processing can be performed by another CPU different from the CPU 21 and having a similar function.

The first storage unit 23 is a storage area used by the CPU 21. The first storage unit 23 can consist of mainly a semiconductor memory such as a dynamic RAM (DRAM) or a static RAM (SRAM).

An internal area of the first storage unit 23 is divided into a program storage area and an application buffer area for use by the application software, and a descriptor for packet transfer is stored in the areas. The term "descriptor" herein refers to information used in packet transfer by the DMA control unit 25 described below and describes address information about a source that transfers data, address information about a destination, and data transfer size information.

The second storage unit 24 is a storage area used by the video packet processing unit 22. Like the first storage unit 23, the second storage unit 24 consists of mainly a semiconductor memory such as a DRAM or SRAM. An internal area of the second storage unit 24 stores a descriptor for video packet transmission.

While the first storage unit 23 and the second storage unit 24 are occupied by the CPU 21 and the video packet processing unit 22, respectively, as illustrated in the example illustrated in FIG. 2, this is not intended as a limitation. For example, the first storage unit 23 and the second storage unit 24 can be configured as a single storage unit, and the CPU 21 and the video packet processing unit 22 can share and use the single storage unit.

The DMA control unit 25 performs DMA transfer to transfer data directly between the PHY/MAC interface 26 and each storage unit based on an instruction from the CPU 21 or the video packet processing unit 22.

Specifically, the DMA control unit 25 performs DMA transfer based on the content of the descriptor generated by the CPU 21 and the content of the descriptor generated by the video packet processing unit 22.

According to the present exemplary embodiment, the DMA control unit 25 selects a descriptor to be used in DMA transfer based on an instruction from an analysis unit 272 in the packet analysis processing unit 27. After completing the DMA transfer, the DMA control unit 25 transmits a notification of a completion interrupt 201 corresponding to the descriptor used in the DMA transfer to one of the CPU 21 and the video packet processing unit 22 that is the source of the DMA transfer instruction.

The PHY/MAC interface 26 is an interface between the camera adapter 2 and a network 202 such as a local area network (LAN). The PHY/MAC interface 26 performs communication control on the physical (PHY) layer and the media access control (MAC) layer (data link layer) in communication.

The PHY/MAC interface 26 further outputs reception timestamps of all received communication packets. The term "timestamp" herein refers to time information about a timing at which the PHY/MAC interface 26 transmits or receives a communication packet. The timestamps are used in calculation for time correction in PTP protocol processing.

The packet analysis processing unit 27 includes a timestamp temporary storage unit 271, the analysis unit 272, an analysis result storage unit 273, a timestamp sorting unit 274, a timestamp storage unit 275, and a register unit 276.

The timestamp temporary storage unit 271 is a storage unit that temporarily stores the reception timestamps output from the PHY/MAC interface 26 and can be a first-input-first-out (FIFO) memory.

The analysis unit 272 analyzes a MAC header of each communication packet received by the PHY/MAC interface 26. Specifically, the analysis unit 272 identifies an EtherType of the received communication packet and notifies each of the DMA control unit 25 and the analysis result storage unit 273 of an analysis result.

The notification of the analysis result from the analysis unit 272 can be transmitted directly to the timestamp sorting unit 274 without storing the analysis result in the analysis result storage unit 273.

The analysis result storage unit 273 is a storage unit that stores the analysis results of the analysis and identification of the received communication packets by the analysis unit 272 and can be a FIFO memory.

The timestamp sorting unit 274 refers to the analysis results stored in the analysis result storage unit 273 and sorts the reception timestamps stored in the timestamp temporary storage unit 271 into any of the plurality of timestamp storage units 275.

Each of the plurality of timestamp storage units 275(#1) to 275(#N) consists of a FIFO memory and stores the reception timestamps sorted by the timestamp sorting unit 274. Each reception timestamp is stored in a predetermined FIFO memory based on the packet type that is the analysis result of the corresponding received communication packet.

The register unit 276 stores information about correspondences between the analysis results and the descriptors, between the analysis results and information about discarding, and between the analysis results and the timestamp storage units 275 to store the analysis results. The foregoing sets of information stored in the register unit 276 are information used for determining which descriptor the DMA control unit 25 is to use for a received communication packet. The sets of information stored in the register unit 276 are also information used for determining into which one of the timestamp storage units 275 the timestamp sorting unit 274 is to sort a reception timestamp.

The CPU 21 sets the foregoing sets of information to the register unit 276 before starting DMA transfer.

<Sequence of PTP Time Synchronization>

Figure 3:
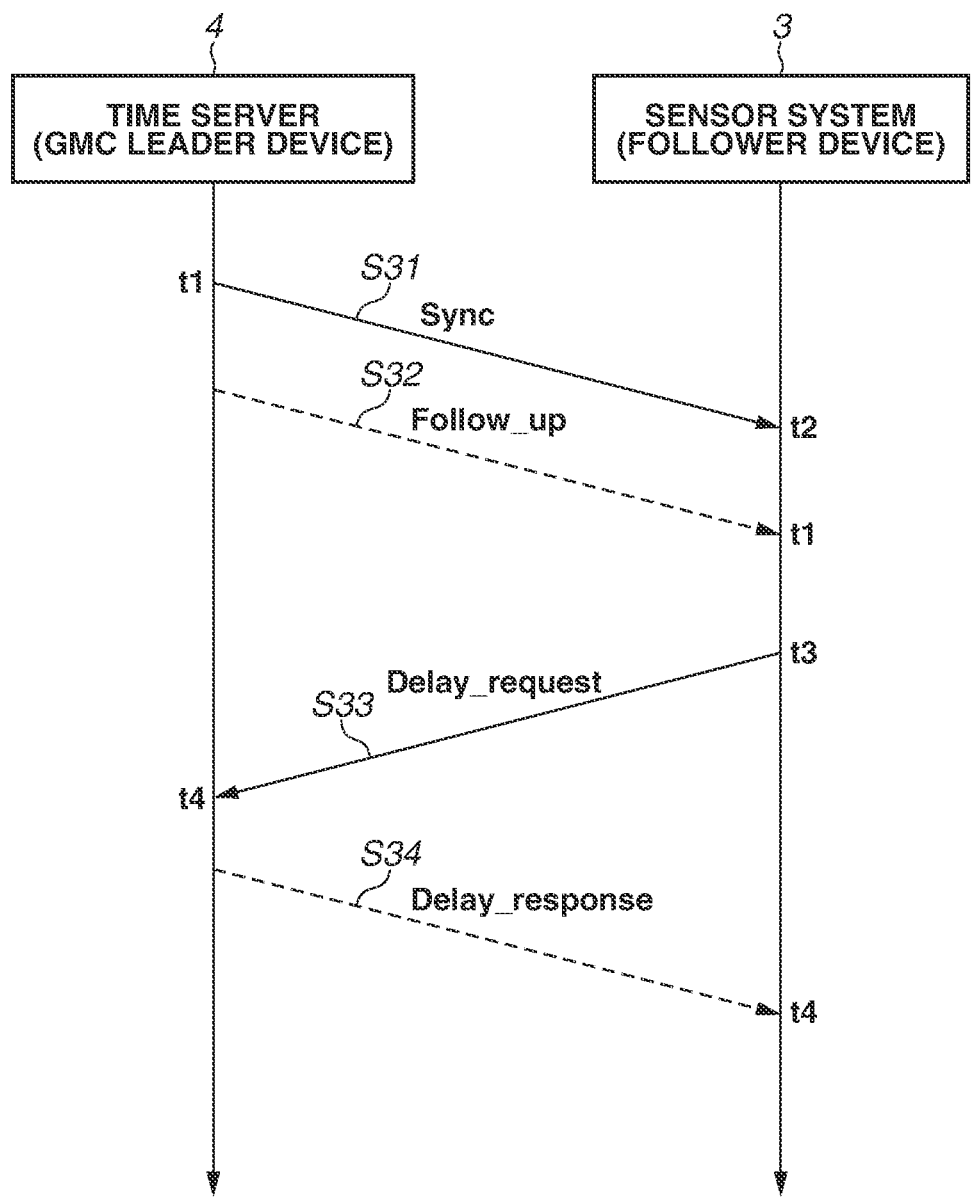
FIG. 3 is a sequence diagram illustrating an example of a process of Precision Time Protocol (PTP) time synchronization processing.

FIG. 3 is a sequence diagram illustrating an example of the PTP time synchronization processing.

In PTP time synchronization, synchronization packets for time synchronization are transmitted and received between a PTP GMC leader device and a PTP follower device.

An example where the time server 4 in FIG. 1 operates as a GMC leader device and the sensor system 3 in FIG. 1 operates as a PTP follower device will be described below with reference to FIG. 3.

In step S31, the time server 4 as a GMC leader device transmits a synchronization packet Sync to the sensor system 3 as a PTP follower device at predetermined intervals. The sensor system 3 having received a synchronization packet Sync holds reception timestamp information t2 about the received synchronization packet Sync.

In step S32, the time server 4 as a GMC leader device transmits a synchronization packet Follow_Up carrying transmission timestamp information t1 about the transmission of the synchronization packet Sync to the sensor system 3 serving as a PTP follower device. The sensor system 3 having received a synchronization packet Follow_Up acquires the transmission timestamp information t1 carried by the synchronization packet Follow_up and holds the acquired transmission timestamp information t1.

While the example is illustrated in FIG. 3 where the synchronization packet Follow_Up carrying the transmission timestamp information t1 about the transmission of the synchronization packet Sync is transmitted, this is not intended as a limitation. For example, the transmission timestamp information t1 about the synchronization packet Sync can be carried by the synchronization packet Sync instead of the synchronization packet Follow_Up, and the synchronization packet Sync carrying the transmission timestamp information t1 can be transmitted.

In step S33, the sensor system 3 as a PTP follower device transmits a synchronization packet Delay_Request to the time server 4 serving as a GMC leader device. At this time, the sensor system 3 holds transmission timestamp information t3 about the transmission of the synchronization packet Delay_Request.

In step S34, the time server 4 as a GMC leader device transmits a synchronization packet Delay_Response to the sensor system 3 as a PTP follower device. At this time, the time server 4 transmits a synchronization packet Delay_Response carrying reception timestamp information t4 about the reception of the synchronization packet Delay_Request to the sensor system 3.

By receiving the synchronization packet Delay_Response, the sensor system 3 acquires the reception timestamp information t4 about the reception of the synchronization packet Delay_Request by the time server 4 and holds the reception timestamp information t4.

The sensor system 3 as a PTP follower device calculates an average transmission delay time using the timestamp information t1 to t4 acquired through the synchronization packet transmission and reception in steps S31 to S34 and corrects the time in the sensor system 3.

The average transmission delay time is calculated using the following formula, $\{(t2-t1)+(t4-t3)\}/2=$(average transmission delay time).

According to the present exemplary embodiment, when the sensor system 3 receives a synchronization packet Sync, the packet analysis processing unit 27 stores the reception timestamp information t2 in the sequence of the PTP time synchronization processing in FIG. 3 in a predetermined timestamp storage unit 275 based on the packet type. The CPU 21 executes the PTP time synchronization processing using the reception timestamp information t2 stored in the predetermined the timestamp storage unit 275 corresponding to the predetermined packet type (PTP packet).

<Packet Reception and Analysis Processing>

Figure 4:
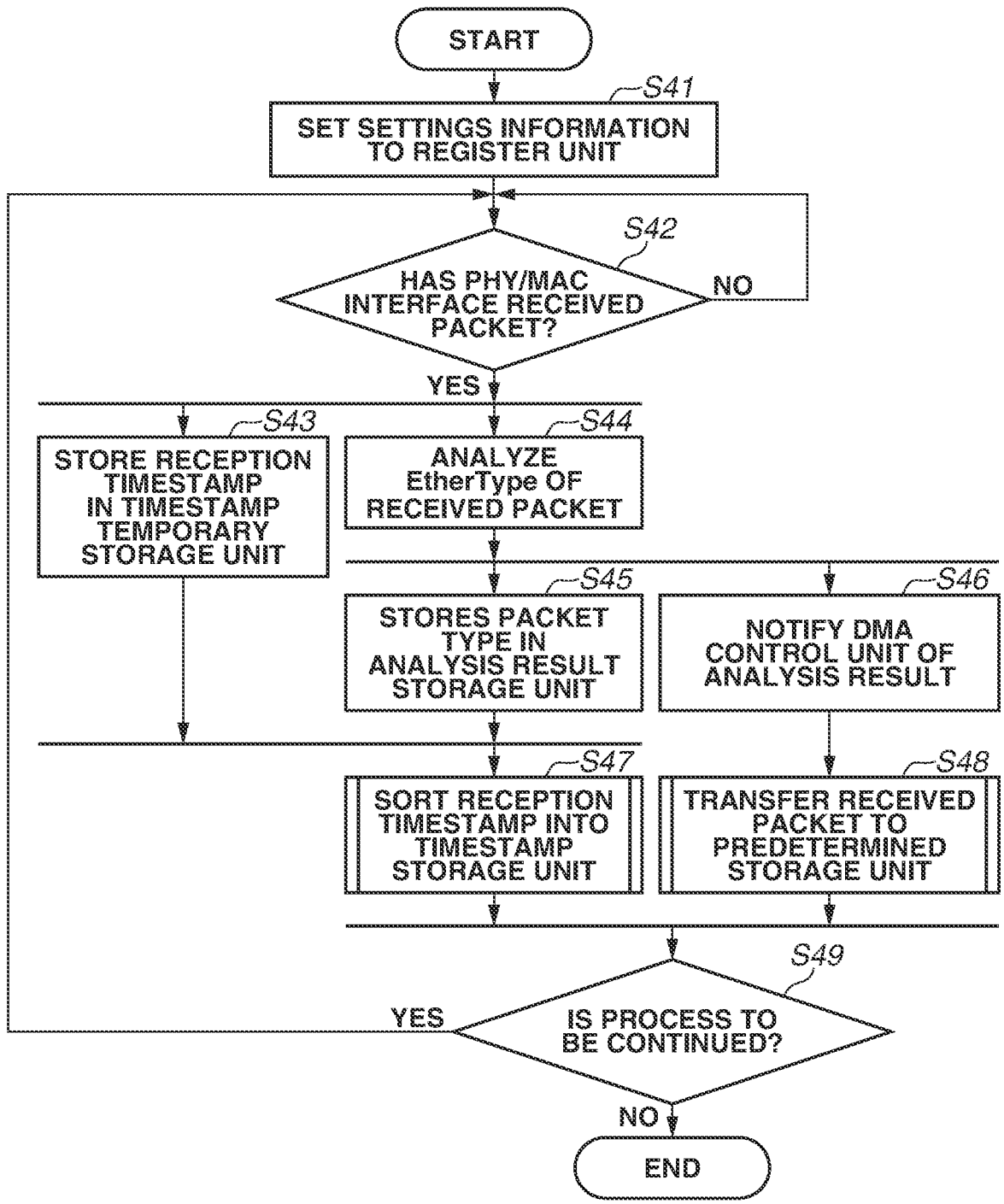
FIG. 4 is a flowchart illustrating an example of a process of communication packet reception processing that is performed by a camera adapter according to an exemplary embodiment.

FIG. 4 is a flowchart illustrating an example of a process of receiving a communication packet and analyzing the received communication packet that is performed by the camera adapter 2 according to an exemplary embodiment.

The process illustrated in FIG. 4 can be started when, for example, the sensor system 3 is activated. However, the timing to start the process is not limited to such a timing. The timing can be, for example, when a communication function of the sensor system 3 is started, or a user can input a trigger via a graphical user interface (GUI).

In step S41, the CPU 21 of the camera adapter 2 sets settings information to the register unit 276. Specifically, the CPU 21 sets information, to the register unit 276, about correspondences, for example, between analysis results of communication packets to be received and the descriptors, between the analysis results and information about packet discarding, and between the analysis results and the timestamp storage units 275 to store the analysis results.

While FIG. 4 illustrates an example where the CPU 21 sets the settings information to the register unit 276 after the sensor system 3 is activated, this is not intended as a limitation. For example, the settings information can be set as initial settings to the register unit 276 when the sensor system 3 is activated.

In step S42, the PHY/MAC interface 26 determines whether the PHY/MAC interface 26 of the camera adapter 2 has received a communication packet. In a case where the PHY/MAC interface 26 has received a communication packet (YES in step S42), the processing proceeds to steps S43 and S44. In contrast, in a case where the PHY/MAC interface 26 has not received a communication packet (NO in step S42), the processing of step S42 is repeated to wait for communication packet reception.

In step S43, the timestamp temporary storage unit 271 of the camera adapter 2 temporarily stores a reception timestamp fed from the PHY/MAC interface 26. After the reception timestamp is stored in the timestamp temporary storage unit 271, the processing proceeds to step S47.

In step S44 after the communication packet is received by the PHY/MAC interface 26 in step S42, the analysis unit 272 of the camera adapter 2 analyzes a MAC header of the received communication packet, in parallel with the processing of step S43.

Specifically, the analysis unit 272 reads a type field of the MAC header (Ethernet header) of the received communication packet and identifies an EtherType specifying a packet type of the received communication packet.

The EtherType is a 2-octet field in an Ethernet frame and indicates an upper layer protocol encapsulated in the payload of the frame.

For example, an EtherType of 0x0800 indicates an IPv4 packet, an EtherType of 0x86DD indicates an Internet Protocol version 6 (IPv6) packet, and an EtherType of 0x88F7 indicates a PTP packet. After the analysis unit 272 analyzes the MAC header of the received communication packet and identifies the EtherType, the processing proceeds to steps S45 and S46.

In step S45, the analysis unit 272 of the camera adapter 2 stores, based on the EtherType identified in step S44, the packet type of the communication packet corresponding to the reception timestamp stored in the timestamp temporary storage unit 271 in step S43, in the analysis result storage unit 273. After the analysis unit 272 stores the packet type, which is the analysis result, in the analysis result storage unit 273, the processing proceeds to step S47.

In step S46, the analysis unit 272 of the camera adapter 2 notifies the DMA control unit 25 of a descriptor to be used based on the packet type (EtherType) identified in step S44, in parallel with the processing of step S45. The correspondence between the EtherType identified in step S44 and the descriptor to be used is acquired by referring to the settings information preset to the register unit 276 in step S41. Alternatively, the analysis unit 272 can notify the DMA control unit 25 of the identified packet type, and the DMA control unit 25 can refer to the register unit 276 and acquire the descriptor corresponding to the notified packet type. In other words, the analysis unit 272 notifies the DMA control unit 25 of information indicating the packet type that is the analysis result. After the analysis unit 272 notifies the DMA control unit 25 of the descriptor to be used or the packet type, the processing proceeds to step S48.

In step S47 after the reception timestamp storage processing of step S43 and the packet type storage processing of step S45 are completed, the timestamp sorting unit 274 of the camera adapter 2 sorts the reception timestamp into one of the plurality of timestamp storage units 275(#1) to 275(#N). Details of the reception timestamp sorting processing of step S47 will be described below with reference to FIG. 5.

After the timestamp sorting unit 274 completes the reception timestamp sorting processing, the processing proceeds to step S49.

In step S48 after the analysis unit 272 notifies the DMA control unit 25 of the descriptor to be used for the received communication packet or the packet type in step S46, the DMA control unit 25 of the camera adapter 2 selects the notified descriptor. The DMA control unit 25 transfers the received communication packet to a predetermined memory based on the selected descriptor. The predetermined memory to which the received communication packet is to be transferred in step S48 is one of the first storage unit 23 and the second storage unit 24 in FIG. 1. Details of the reception packet transfer processing of step S48 will be described below with reference to FIG. 6.

In step S49 after the reception timestamp sorting processing of step S47 and the reception packet transfer processing of step S48 are completed, the CPU 21 of the camera adapter 2 determines whether to continue the series of processing performed in steps S42 to S48. For example, in a case where a factor to end the state of communication with an external device arises, the CPU 21 determines to not continue the processing (NO in step S49), and the process illustrated in FIG. 4 ends. Otherwise (YES in step S49), the processing returns to step S42 to repeat steps S42 to S48.

As described above, the reception timestamp is sorted into one of the plurality of timestamp storage units 275 based on the analyzed packet type in step S47, and the received communication packet is transferred to one of the first storage unit 23 and the second storage unit 24 in step S48.

The received communication packets and the reception timestamps are associated based on the packet type. Thus, each of a plurality of reception control modules that processes a communication packet transferred to the first storage unit 23 or the second storage unit 24 acquires a reception timestamp corresponding to a communication packet to be processed from the timestamp storage unit 275.

For example, the CPU 21 reads a communication packet of a packet type that is the PTP packet from the first storage unit 23 and reads a reception timestamp corresponding to the read PTP packet from the timestamp storage unit 275 storing the PTP packets. The CPU 21 thereby performs the PTP time synchronization processing using the appropriate reception timestamp for the PTP packet.

The video packet processing unit 22 reads a communication packet of a packet type that is the video packet from the second storage unit 24 and reads a reception timestamp corresponding to the read video packet from the timestamp storage unit 275 storing the video packets.

<Reception Timestamp Sorting Processing>

Figure 5:
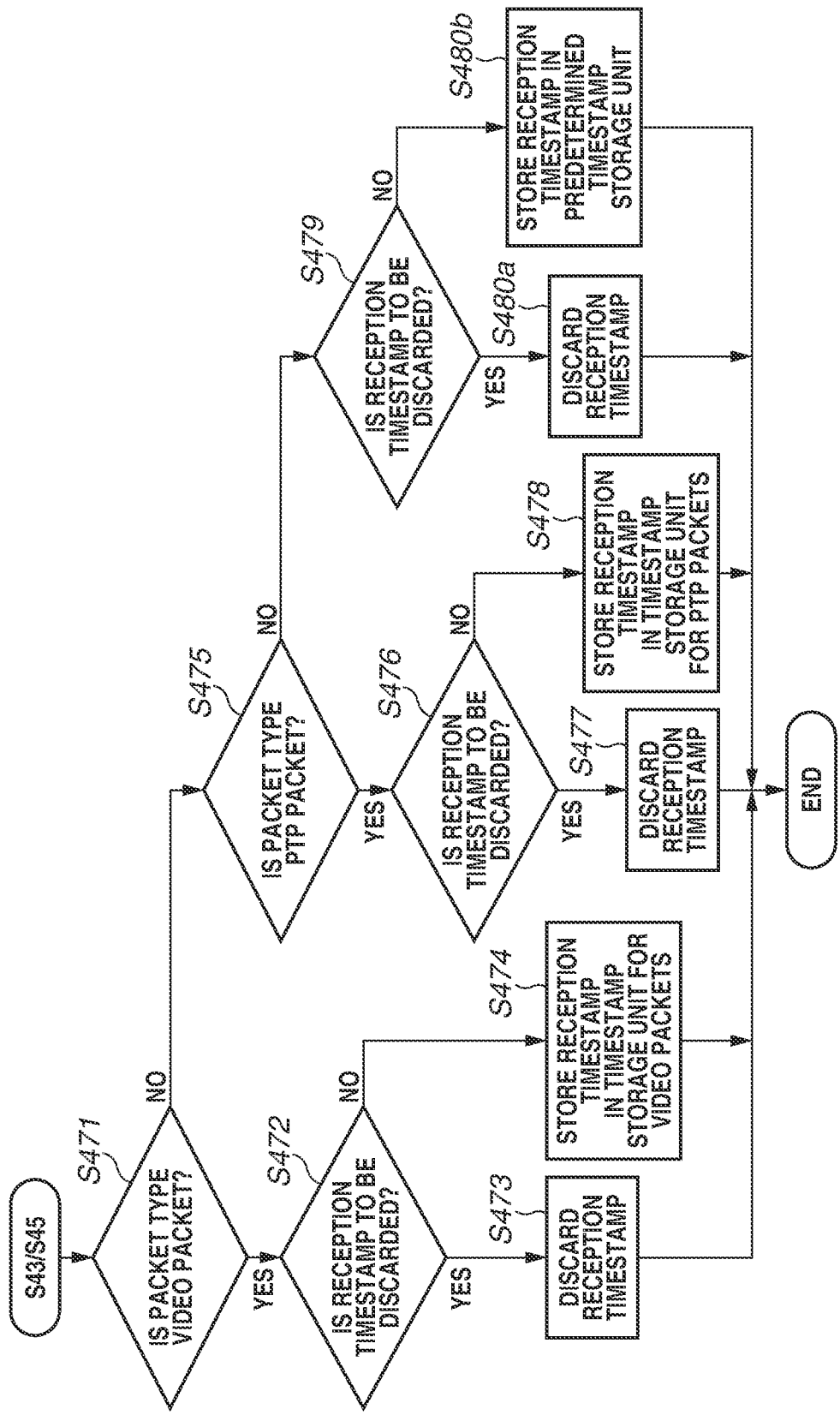
FIG. 5 is a flowchart illustrating an example of a detailed process of reception timestamp sorting processing illustrated in FIG. 4 according to a first exemplary embodiment.

FIG. 5 is a flowchart illustrating an example of a detailed process of the reception timestamp sorting processing (step S47) illustrated in FIG. 4.

After the reception timestamp is stored in the timestamp temporary storage unit 271 in step S43 and the packet type of the communication packet corresponding to the reception timestamp is stored in the analysis result storage unit 273 in step S45 illustrated in FIG. 4, the processing proceeds to step S471 in FIG. 5.

In step S471, the timestamp sorting unit 274 of the camera adapter 2 determines whether the packet type of the communication packet corresponding to the reception timestamp stored in the analysis result storage unit 273 is the video packet. In a case where the packet type is the video packet (YES in step S471), the processing proceeds to step S472. In a case where the packet type is not the video packet (NO in step S471), the processing proceeds to step S475.

In the case where the packet type is the video packet, in step S472, the timestamp sorting unit 274 determines whether to discard the reception timestamp of the video packet.

Specifically, the timestamp sorting unit 274 reads the settings information preset to the register unit 276 by the CPU 21 and determines whether to discard the reception timestamp or store the reception timestamp in the timestamp storage unit 275.

In a case where the timestamp sorting unit 274 determines to discard the reception timestamp (YES in step S472), the processing proceeds to step S473. In contrast, in a case where the timestamp sorting unit 274 determines to not discard the reception timestamp (NO in step S472), the processing proceeds to step S474.

In the case where the timestamp sorting unit 274 determines to discard the reception timestamp in step S472, the timestamp sorting unit 274 discards, in step S473, the reception timestamp corresponding to the video packet, and the processing proceeds to step S49 in FIG. 4.

Specifically, the timestamp sorting unit 274 can discard the reception timestamp by, for example, writing the reception timestamp to be discarded to the timestamp storage unit 275 to be used for discarding among the plurality of timestamp storage units 275. Alternatively, the timestamp sorting unit 274 can write the reception timestamp to be discarded to an area that is prepared for discarding and is different from the timestamp storage unit 275, or the timestamp sorting unit 274 can read and discard a temporarily-stored reception timestamp. A similar method for discarding a reception timestamp can also be used in steps S477 and S480a described below.

In the case where the timestamp sorting unit 274 determines to not discard the reception timestamp in step S472, the timestamp sorting unit 274 stores, in step S474, the reception timestamp corresponding to the video packet in the timestamp storage unit 275 to be used for video packets, and the processing proceeds to step S49 in FIG. 4.

Specifically, in a case where three timestamp storage units 275 are prepared, the timestamp sorting unit 274 sorts a reception timestamp of a PTP packet into the timestamp storage unit 275(#1). Further, the timestamp sorting unit 274 sorts a reception timestamp of a video packet into the timestamp storage unit 275(#2). Similarly, the timestamp sorting unit 274 sorts a reception timestamp of a packet different from both the PTP packet and the video packet into the timestamp storage unit 275(#3).

A method for associating a packet type and a reception timestamp storage destination with each other is not limited to that described above. The CPU 21 can preset a correspondence between a packet type and a timestamp storage unit 275(#N) for storing reception timestamps of the packet type, to the register unit 276 as the settings information. A similar method for associating a packet type and a timestamp storage destination with each other can also be used in steps S478 and S480b described below.

Back to step S471, in a case where the packet type is not the video packet (NO in step S471), the processing proceeds to step S475. In step S475, the timestamp sorting unit 274 determines whether the packet type of the communication packet corresponding to the reception timestamp stored in the analysis result storage unit 273 is the PTP packet. In a case where the packet type is the PTP packet (YES in step S475), the processing proceeds to step S476. In a case where the packet type is not the PTP packet (NO in step S475), the processing proceeds to step S479.

In the case where the packet type is the PTP packet, the timestamp sorting unit 274 determines, in step S476, whether to discard the reception timestamp of the PTP packet.

Specifically, the timestamp sorting unit 274 reads the settings information preset to the register unit 276 by the CPU 21 and determines whether to discard the reception timestamp or store the reception timestamp in the timestamp storage unit 275.

In a case where the timestamp sorting unit 274 determines to discard the reception timestamp (YES in step S476), the processing proceeds to step S477. In a case where the timestamp sorting unit 274 determines to not discard the reception timestamp (NO in step S476), the processing proceeds to step S478.

In step S477, the timestamp sorting unit 274 discards the reception timestamp corresponding to the PTP packet, and the processing proceeds to step S49 in FIG. 4.

In step S478, the timestamp sorting unit 274 stores the reception timestamp corresponding to the video packet in the timestamp storage unit 275 for PTP packets, and the processing proceeds to step S49 in FIG. 4.

Back to step S475, in a case where the packet type is neither the video packet nor the PTP packet (NO in step S475), the processing proceeds to step S479. In step S479, the timestamp sorting unit 274 determines whether to discard the reception timestamp of the communication packet of another packet type.

Specifically, the timestamp sorting unit 274 reads the settings information preset to the register unit 276 by the CPU 21 and determines whether to discard the reception timestamp or store the reception timestamp in the timestamp storage unit 275.

In a case where the timestamp sorting unit 274 determines to discard the reception timestamp (YES in step S479), the processing proceeds to step S480*a*. In a case where the timestamp sorting unit 274 determines to not discard the reception timestamp (NO in step S479), the processing proceeds to step S480*b*.

In step S480*a*, the timestamp sorting unit 274 discards the reception timestamp corresponding to the communication packet of another packet type, and the processing proceeds to step S49 in FIG. 4.

In step S480*b*, the timestamp sorting unit 274 stores the reception timestamp corresponding to the communication packet of another packet type in the predetermined timestamp storage unit 275, and the processing proceeds to step S49 in FIG. 4.

<Reception Packet Sorting Processing>

Figure 6:
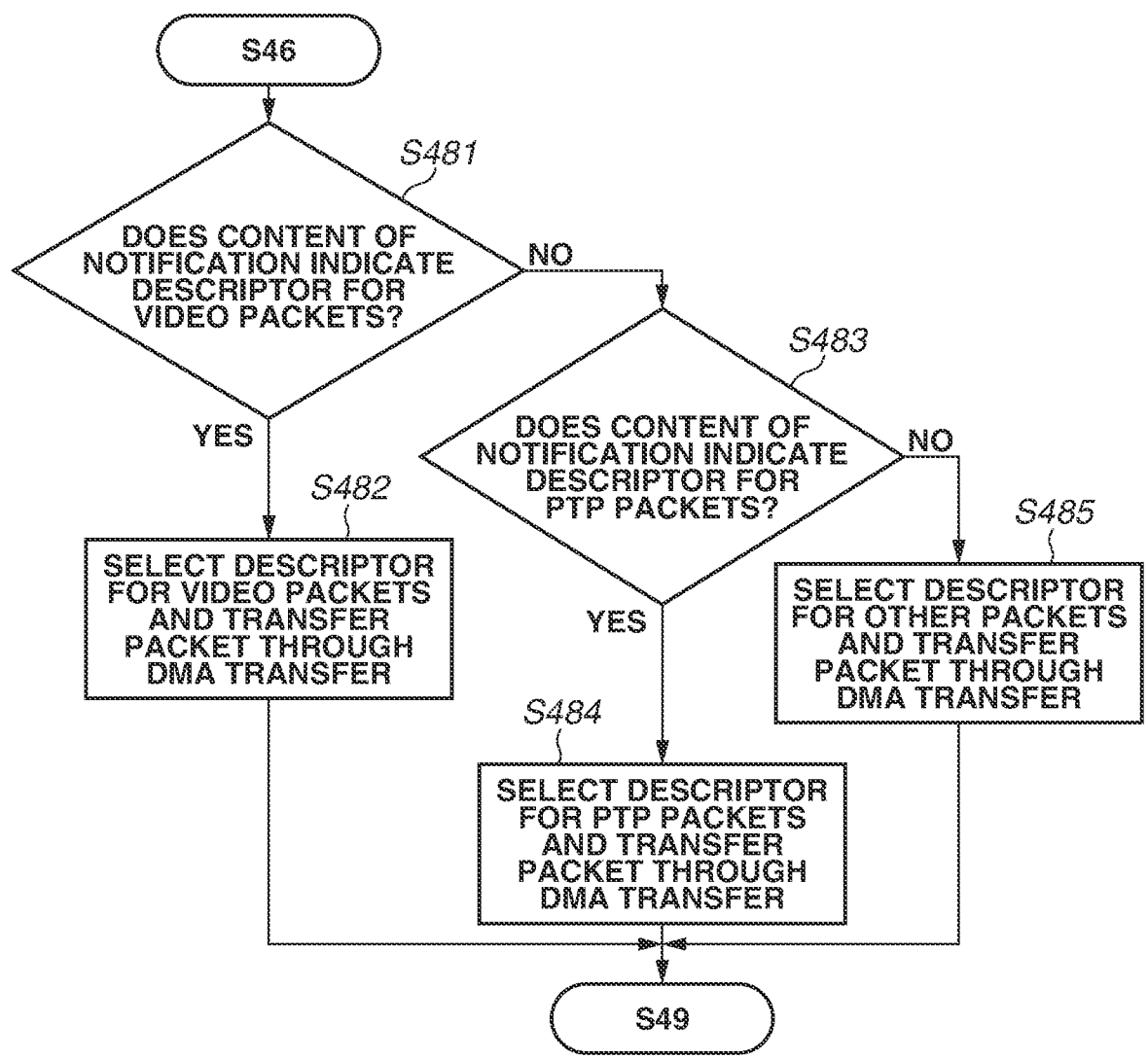
FIG. 6 is a flowchart illustrating an example of a detailed process of reception packet sorting processing illustrated in FIG. 4.

FIG. 6 is a flowchart illustrating an example of a detailed process of the reception packet sorting processing (step S48) in FIG. 4.

After the analysis unit 272 notifies the DMA control unit 25 of the descriptor to be used or the packet type based on the packet type (EtherType) identified by the analysis unit 272 in step S46 illustrated in FIG. 4, the processing proceeds to step S481 in FIG. 6.

In step S481, the DMA control unit 25 of the camera adapter 2 determines whether the content of the notification from the analysis unit 272 indicates the descriptor for video packets. In a case where the content of the notification from the analysis unit 272 indicates the descriptor for video packets (YES in step S481), the processing proceeds to step S482. In a case where the content of the notification from the analysis unit 272 does not indicate the descriptor for video packets (NO in step S481), the processing proceeds to step S483.

In step S482, the DMA control unit 25 selects the descriptor for video packets and transfers the video packet through DMA transfer to the predetermined storage unit for video packets, and the processing proceeds to step S49 in FIG. 4.

In step S483, the DMA control unit 25 determines whether the content of the notification from the analysis unit 272 indicates the descriptor for PTP packets. In a case where the content of the notification from the analysis unit 272 indicates the descriptor for PTP packets (YES in step S483), the processing proceeds to step S484. In a case where the content of the notification from the analysis unit 272 does not indicate the descriptor for PTP packets (NO in step S483), the processing proceeds to step S485.

In step S484, the DMA control unit 25 selects the descriptor for PTP packets and transfers the PTP packet through DMA transfer to the predetermined storage unit for PTP packets, and the processing proceeds to step S49 in FIG. 4.

In step S485, the DMA control unit 25 selects a descriptor for other communication packets different from both the video packets and the PTP packets. The DMA control unit 25 then transfers the communication packet through DMA transfer to a predetermined storage unit corresponding to the packet type of the communication packet, and the processing proceeds to step S49 in FIG. 4.

<PTP Time Synchronization Processing in Sensor System 3>

Figure 7:
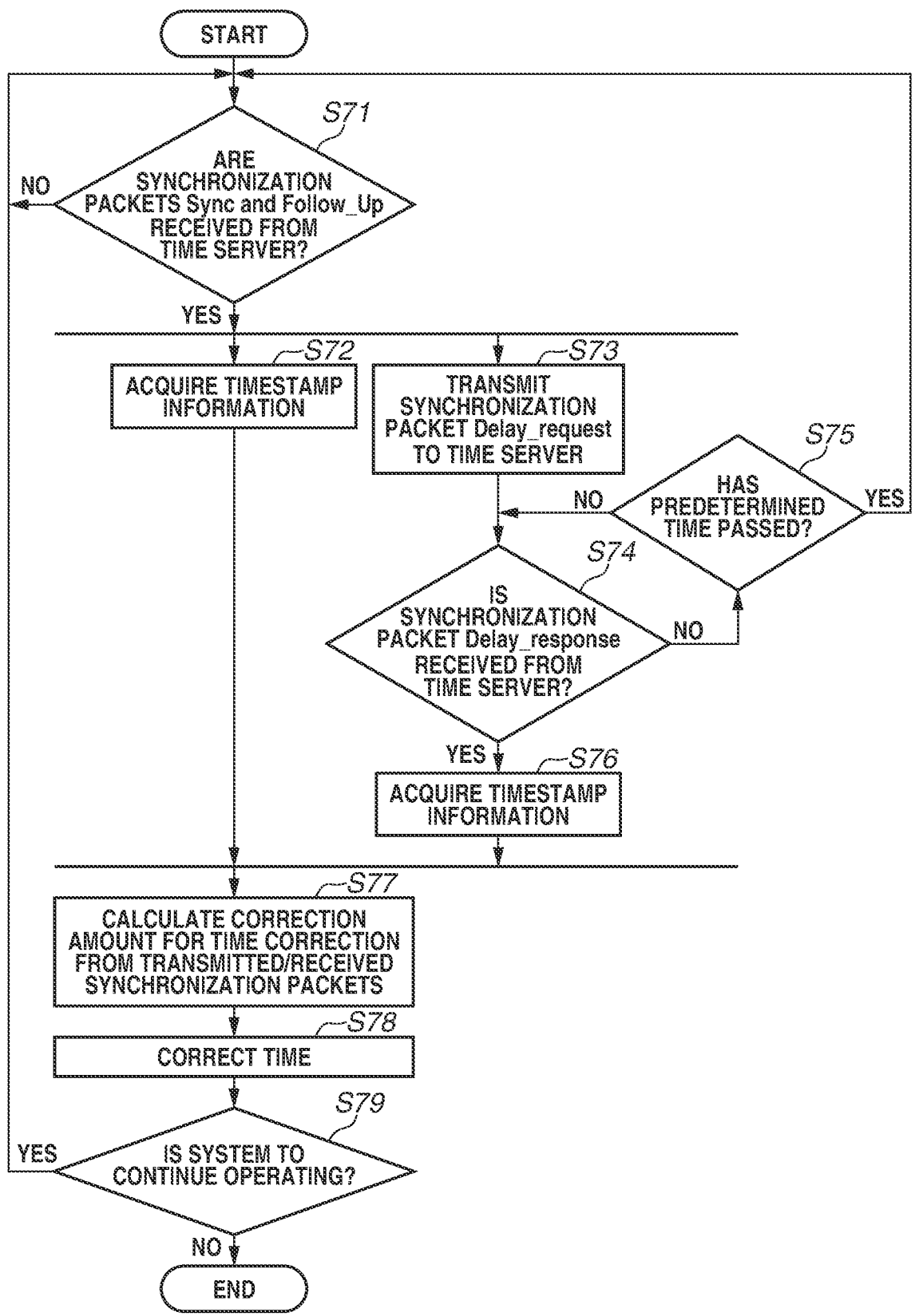
FIG. 7 is a flowchart illustrating an example of a process of PTP time synchronization processing according to an exemplary embodiment.

FIG. 7 is a flowchart illustrating an example of a process of the PTP time synchronization processing performed by the sensor system 3 with the time server 4 using the reception timestamps of the PTP packets (synchronization packets) sorted by the timestamp sorting unit 274.

An example where the time server 4 operates as a PTP leader device (GMC leader device) and the sensor system 3 operates as a PTP follower device in the synchronization imaging system 10 will be described below with reference to FIG. 7. The synchronization packet transmission and reception processing and the PTP time synchronization processing in the sensor system 3 can be performed by the CPU 21 of the camera adapter 2, but the CPU 21 is not a limited performer. The synchronization packet transmission and reception processing and the PTP time synchronization processing can be performed by a CPU of the camera 1 or another device of the sensor system 3 or can be partially or entirely offloaded to hardware.

In step S71, the CPU 21 of the camera adapter 2 of the sensor system 3 determines whether synchronization packets Sync and Follow_Up are received from the time server 4. In a case where synchronization packets Sync and Follow_Up are received (YES in step S71), the processing proceeds to steps S72 and S73. In a case where synchronization packets Sync and Follow_Up are not received (NO in step S71), the processing returns to step S71 to wait for reception of synchronization packets Sync and Follow_up.

In the case where synchronization packets Sync and Follow_up are received in step S71, the CPU 21 acquires, in step S72, timestamp information about each of the synchronization packets Sync and Follow_Up.

Specifically, in a case where the PHY/MAC interface 26 receives a synchronization packet Sync, the packet analysis processing unit 27 (timestamp sorting unit 274) stores the reception timestamp information t2 about the synchronization packet Sync in the predetermined timestamp storage unit 275 for PTP packets.

After the DMA control unit 25 completes the DMA transfer of the synchronization packet Sync to a predetermined storage unit (first storage unit 23), the DMA control unit 25 notifies the CPU 21 of the completion interruption 201. The CPU 21 having received the completion interruption 201 acquires the reception timestamp information t2 stored in the predetermined timestamp storage unit 275 for PTP packets.

Meanwhile, the time server 4 transmits a synchronization packet Follow_up carrying the transmission timestamp information t1 about the transmission of the synchronization packet Sync to the sensor system 3. The PHY/MAC interface 26 of the camera adapter 2 of the sensor system 3 receives the synchronization packet Follow_up. The DMA control unit 25 then transfers the received synchronization packet Follow_up to a predetermined storage unit (first storage unit 23) through DMA transfer and notifies the CPU 21 of the completion interruption 201. The CPU 21 having received the completion interruption 201 acquires the transmission timestamp information t1 about the transmission of the synchronization packet Sync by the time server 4, from the synchronization packet Follow_up transferred to the predetermined storage unit through DMA transfer.

Back to step S71, in a case where synchronization packets Sync and Follow_up are received (YES in step S71), the processing proceeds to step S73. In step S73, the CPU 21 generates a synchronization packet Delay_request in parallel with the processing of step S72. The CPU 21 transmits the generated synchronization packet Delay_request to the time server 4.

At this time, the CPU 21 acquires the transmission timestamp information t3 about the transmission of the synchronization packet Delay_request.

In step S74, the CPU 21 determines whether a synchronization packet Delay_response is received from the time server 4. In a case where a synchronization packet Delay_response is received (YES in step S74), the processing proceeds to step S76. In a case where a synchronization packet Delay_response is not received (NO in step S74), the processing proceeds to step S75.

In step S75, the CPU 21 determines whether a predetermined time has passed. Unless the predetermined time has passed (NO in step S75), the processing returns to step S74 to wait for reception of a synchronization packet Delay_response from the time server 4. In a case where the predetermined time has passed (YES in step S75), the processing returns to step S71.

In step S76, the CPU 21 acquires timestamp information about the synchronization packet Delay_response.

Specifically, the PHY/MAC interface 26 receives the synchronization packet Delay_response, and the DMA control unit 25 transfers the synchronization packet Delay_response to a predetermined storage unit (first storage unit 23) through DMA transfer. After the DMA transfer of the synchronization packet Delay_response is completed, the DMA control unit 25 notifies the CPU 21 of the completion interruption 201. The CPU 21 having received the completion interruption 201 acquires the reception timestamp information t4 about the reception of the synchronization packet Delay_request by the time server 4, from the synchronization packet Delay_respose transferred to the predetermined storage unit through DMA transfer.

In step S77 after steps S72 to S76 are performed, the CPU 21 calculates a time difference between the time of the time server 4 and the time of the sensor system 3 using the timestamp information t1 to t4 acquired by the CPU 21 and determines a correction amount for correcting the time of the sensor system 3.

In step S78, the CPU 21 corrects the time of the sensor system 3 based on the correction amount determined in step S77. As a result of completing the time correction processing, the time of the sensor system 3 is synchronized with the time of the time server 4.

In a case where a great amount is corrected in one correction, the operation of the entire sensor system 3 may become unstable. Thus, the time correction can be performed step by step over a predetermined period of time, or an amount to be corrected in one correction can be limited.

In step S79, the CPU 21 determines whether the sensor system 3 is to continue operating. Examples include a case where the control terminal 6 stops the synchronization imaging processing of the entire sensor systems 3a, 3b, . . . , and 3z, and a case where the control terminal 6 stops the synchronization imaging processing of only a selected one of the sensor systems 3a, 3b, . . . , and 3z.

In a case where the sensor system 3 is to continue operating (YES in step S79), the processing returns to step S71, and steps S71 to S78 are repeated. In a case where the sensor system 3 is not to continue operating (NO in step S79), the process ends.

As described above, according to the present exemplary embodiment, a communication apparatus receives a communication packet, acquires a reception timestamp of the received communication packet, analyzes the received communication packet, and identifies the packet type of the communication packet. The communication apparatus transfers the communication packet to a predetermined storage unit based on the identified packet type, and stores the identified packet type in association with the acquired reception timestamp.

The reception packet and the reception timestamp are therefore associated with each other, even in a case where the reception packet and the reception timestamp are output separately and a module to perform the reception processing is changed based on the type of the reception packet in the communication apparatus. Thus, time synchronization with another communication apparatus is performed using an appropriate reception timestamp. The present exemplary embodiment therefore contributes to the accuracy of time synchronization processing between a plurality of communication apparatuses.

A difference of a second exemplary embodiment according to the present disclosure from the first exemplary embodiment will now be described.

According to the first exemplary embodiment, the timestamp sorting unit 274 sorts a reception timestamp stored in the timestamp temporary storage unit 271 into one of the plurality of timestamp storage units 275 based on a packet type analysis result stored in the analysis result storage unit 273.

According to the second exemplary embodiment, an example will be described where each reception timestamp is given a packet type analysis result and the reception timestamps are stored in one timestamp storage unit 275.

The camera adapter 2 (communication apparatus) according to the second exemplary embodiment have a hardware configuration and a functional configuration similar to those illustrated in FIG. 2 according to the first exemplary embodiment. Since one timestamp storage unit 275 is to be used according to the second exemplary embodiment, the number of timestamp storage units 275 can be one or more. In an example described below, a plurality of timestamp storage units 275 is provided.

FIG. 8 is a flowchart illustrating an example of a detailed process of the reception timestamp sorting processing (step S47) in FIG. 4 according to the second exemplary embodiment.

The process illustrated in FIG. 8 is started after the reception timestamp of the received communication packet is stored in the timestamp temporary storage unit 271 in step S43 in FIG. 4, and the packet type corresponding to the reception stamp is stored in the analysis result storage unit 273 in step S45.

Steps S471 to S473 in FIG. 8 are similar to steps S471 to S473 in FIG. 5 according to the first exemplary embodiment.

In step S472, in a case where the timestamp sorting unit 274 determines to not discard the reception timestamp of the video packet (NO in step S472), the processing proceeds to step S474b.

In step S474b, the timestamp sorting unit 274 adds the analysis result of the packet type of the video packet to the reception timestamp and stores the reception timestamp with the added analysis result in one of the timestamp storage units 275.

For example, the timestamp sorting unit 274 describes the analysis result of the packet type in higher-order bits and the reception timestamp in lower-order bits together in one timestamp information entry. In reading the reception timestamp from the timestamp storage unit 275, the CPU 21 can read the analysis result of the packet type and the reception timestamp simultaneously and can identify the packet type of the read reception timestamp.

While one timestamp storage unit 275 is used in the above-described example, this is not intended as a limitation. For example, the reception timestamp can be further divided into higher-order bits and lower-order bits, and the divided bits can be stored in different timestamp storage units 275. For example, the analysis result and the reception timestamp (higher-order bits) are stored in the timestamp storage unit 275(#1) while the analysis result and the reception timestamp (lower-order bits) are stored in the timestamp storage unit 275(#2).

Steps S475 to S477, S479, and S480a are similar to steps S475 to S477, S479, and S480a in FIG. 5 according to the first exemplary embodiment.

As illustrated in FIG. 8, as in step S474b, the timestamp sorting unit 274 adds, in step S478b, the analysis result of the packet type of the PTP packet to the reception timestamp and stores the reception timestamp with the added analysis result in one of the timestamp storage units 275.

In step S480c, as in step S474b, the timestamp sorting unit 274 adds the analysis result of the predetermined packet type other than the video packet and the PTP packet to the reception timestamp and stores the reception timestamp with the added analysis result in one of the timestamp storage units 275.

According to the present exemplary embodiment as described above, the timestamp sorting unit 274 of the camera adapter 2 adds the packet type to the reception timestamp and stores the reception timestamp with the added packet type in one timestamp storage unit 275. The sensor system 3 according to the present exemplary embodiment thereby performs the PTP time synchronization processing using the appropriate reception timestamp without sorting the reception timestamp into one of the plurality of timestamp storage units 275.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A communication apparatus comprising:
   at least one circuit configured to function as
   a reception unit configured to receive a communication packet;
   a transfer unit configured to transfer the communication packet received by the reception unit to a predetermined memory;
   an acquisition unit configured to acquire a timestamp of a reception of the communication packet by the reception unit;
   an analysis unit configured to analyze a type of the communication packet received by the reception unit;
   a control unit configured to notify the transfer unit of information indicating the type of the communication packet analyzed by the analysis unit and to associate the information with the timestamp acquired by the acquisition unit:, a first temporary storage configured to temporarily store the type of the communication packet analyzed by the analysis unit; and
   a second temporary storage configured to temporarily store the timestamp acquired by the acquisition unit,
   wherein the control unit associates the type of the communication packet read from the first temporary storage with the timestamp read from the second temporary storage.

2. The communication apparatus according to claim 1, further comprising a plurality of storage devices each configured to store the timestamp,
   wherein the control unit sorts the timestamp into one of the plurality of storage devices based on the type of the communication packet.

3. The communication apparatus according to claim 1, wherein the transfer unit selects a descriptor for use in transferring the communication packet through direct memory access (DMA) transfer based on the information indicating the type of the communication packet notified by the control unit.

4. The communication apparatus according to claim 1, wherein the transfer unit selects a memory corresponding to a module that is to process the communication packet based on the information indicating the type of the communication packet notified by the control unit and transfers the communication packet to the selected memory.

5. The communication apparatus according to claim 1, wherein the control unit determines whether to discard the timestamp or store the timestamp in association with the type of the communication packet in a storage unit based on the type of the communication packet.

6. The communication apparatus according to claim 1, wherein the control unit adds the type of the communication packet to the timestamp and stores the timestamp to which the type of the communication packet is added in a storage.

7. The communication apparatus according to claim 1, further comprising a synchronization unit configured to perform time synchronization processing by reading a synchronization packet transferred to the predetermined memory by the transfer unit and acquiring the timestamp associated with the read synchronization packet.

8. The communication apparatus according to claim 7, wherein the synchronization unit performs the time synchronization processing using the Precision Time Protocol (PTP).

9. The communication apparatus according to claim 1, wherein the analysis unit analyzes the type of the communication packet by referring to an EtherType described in a media access control (MAC) header of the communication packet received by the reception unit.

10. A method for controlling a communication apparatus configured to receive a communication packet, the method comprising:

receiving the communication packet;

acquiring a timestamp of a reception of the communication packet;

analyzing a type of the received communication packet;

transferring the received communication packet to a predetermined memory based on information indicating the analyzed type of the communication packet;

temporarily storing the analyzed type of the communication packet in a first temporary storage;

temporarily storing the acquired timestamp in a second temporary storage; and associating the analyzed type of the communication packet read from the first temporary storage with the acquired timestamp read from the second temporary storage.

11. A non-transitory, computer-readable storage medium storing instruction that, when executed by a processor, configures the processor to perform a control method for controlling a communication apparatus that is configured to receive a communication packet, the control method comprising:

receiving the communication packet;

acquiring a timestamp of a reception of the communication packet;

analyzing a type of the received communication packet;

transferring the received communication packet to a predetermined memory based on information indicating the analyzed type of the communication packet;

temporarily storing the analyzed type of the communication packet in a first temporary storage;

temporarily storing the acquired timestamp in a second temporary storage; and associating the analyzed type of the communication packet read from the first temporary storage with the acquired timestamp read from the second temporary storage.

* * * * *